(12) United States Patent
Yeh

(10) Patent No.: US 8,907,920 B2
(45) Date of Patent: Dec. 9, 2014

(54) COMPLEX SENSING ELECTRODE STRUCTURE APPLIED TO A TOUCH PANEL

(75) Inventor: Yu-Chou Yeh, Taoyuan County (TW)

(73) Assignee: J Touch Corporation, Taoyuan County (TW)

(*) Notice: Subject to any disclaimer, the term of this patent is extended or adjusted under 35 U.S.C. 154(b) by 93 days.

(21) Appl. No.: 13/584,040

(22) Filed: Aug. 13, 2012

(65) Prior Publication Data

US 2014/0043250 A1    Feb. 13, 2014

(51) Int. Cl.
*G06F 3/044*    (2006.01)
*G06F 3/041*    (2006.01)

(52) U.S. Cl.
CPC ............... *G06F 3/044* (2013.01); *G06F 3/041* (2013.01)
USPC ........................................ 345/174

(58) Field of Classification Search
None
See application file for complete search history.

(56) References Cited

U.S. PATENT DOCUMENTS

2012/0017433 A1*  1/2012  Chung et al. .................... 29/829
2012/0146942 A1   6/2012  Kamoshida et al.
2013/0228442 A1*  9/2013  Mohaptatra et al. .......... 200/600

FOREIGN PATENT DOCUMENTS

| CN | 1786800 A | 6/2006 |
|---|---|---|
| JP | 63-174212 A | 7/1988 |
| JP | 2011-216061 A | 10/2011 |
| JP | 2012-103761 A | 5/2012 |
| JP | 2012-128605 A | 7/2012 |
| JP | 2012-174578 A | 9/2012 |
| TW | M407438 U1 | 7/2011 |
| TW | 201227834 A1 | 7/2012 |

* cited by examiner

*Primary Examiner* — Joseph Haley
(74) *Attorney, Agent, or Firm* — Li & Cai Intellectual Property (USA) Office

(57) ABSTRACT

A complex sensing electrode structure applied to a touch panel includes a first conductive unit and a second conductive unit. The first conductive unit includes a plurality of first stripped conductive layers disposed on the transparent substrate and separated from each other by a predetermined distance. The second conductive unit includes a plurality of second stripped conductive layers disposed on the transparent substrate to respectively cover the first stripped conductive layers, and the conductive material used by the first stripped conductive layer and the conductive material used by the second stripped conductive layer are different. Hence, the manufacturing cost and the conductibility of the complex sensing electrode structure can be decreased effectively.

9 Claims, 3 Drawing Sheets

COMPLEX SENSING ELECTRODE STRUCTURE APPLIED TO A TOUCH PANEL

BACKGROUND OF THE INVENTION

1. Field of the Invention

The instant disclosure relates to a complex sensing electrode structure, and more particularly to a complex sensing electrode structure applied to a touch panel.

2. Description of Related Art

With information appliance developing, the touch panels have replaced keyboard and mouse to communicate with the information appliance. The touch panels provide users a friendly interface such that operations of computers or electronic products become simple, straightforward, lively and interesting. Depending on fields of applications, touch panels are applied to portable communication and information products (for example, personal digital assistant (PDA)), financial/commercial system, medical registration system, monitoring system, information guiding system, and computer-aided teaching system, and thereby enhancing convenience of handling for users.

Generally speaking, touch panels may be operated by means of infrared, ultrasonic, piezoelectric, capacitive or resistive sensing. The capacitive touch panel has inner wires made of transparent conductive materials (such as ITO material) as an sensing electrode on a glass substrate, and transmitting signals to integrated circuits (IC) configured on an outer flexible PCB or rigid PCB via peripheral conductive wires on the glass substrate. Such structure constitutes a touch sensor, which configured to an outer printed circuit board and a top protecting cover to complete a touch panel. A uniform electric field is generated on surface of the glass substrate when touching. Coordinates of the contact point are determined by variation of capacitance due to electrostatic reaction generated between the user's finger and the electric field when a user touches the touch panel.

However, the sensing electrode of the traditional touch panel is usually pattered by expensive photolithography manufacturing process, and the conductibility of the ITO material is not as good as that of metal material, thus the traditional touch panel has some defect such as high manufacturing cost and low conductibility, especially it is not suitable for developing large touch panel.

SUMMARY OF THE INVENTION

One aspect of the instant disclosure relates to a complex sensing electrode structure applied to a touch panel for effectively decreasing the manufacturing cost and the conductibility.

One of the embodiments of the instant disclosure provides a complex sensing electrode structure applied to a touch panel having a transparent substrate, wherein the complex sensing electrode structure comprises: a first conductive unit and a second conductive unit. The first conductive unit includes a plurality of first stripped conductive layers disposed on the transparent substrate and separated from each other by a predetermined distance. The second conductive unit includes a plurality of second stripped conductive layers disposed on the transparent substrate to respectively cover the first stripped conductive layers, wherein a conductive material used by the first stripped conductive layer and a conductive material used by the second stripped conductive layer are different.

More precisely, the conductive material used by the first stripped conductive layer is a conductive polymer material, and the conductive material used by the second stripped conductive layer is a metal material.

More precisely, the conductive polymer material is one of polyaniline, polyphenylene sulfide, polypyrrole, poly(p-phenylene), polythiophene, poly(p-phenylene vinylene), polyfluorene and polyacetylene.

More precisely, the metal material is one of Cu, Pt, Al, Au and Ag.

More precisely, the conductive material used by the first stripped conductive layer is one of Pd and Sn, and the conductive material used by the second stripped conductive layer is one of Cu, Pt, Al, Au and Ag.

More precisely, each first stripped conductive layer is formed on the transparent substrate by impressing, and each first stripped conductive layer is enclosed by each corresponding second stripped conductive layer by electroless plating.

Therefore, the complex sensing electrode structure can be manufactured by low temperature electroless plating without using the traditional photolithography manufacturing process, thus the instant disclosure can effectively reduce the manpower and the material cost. Furthermore, the complex sensing electrode structure can be composed of the first stripped conductive layers and the second stripped conductive layers that are respectively made of two different conductive materials, thus the conductibility of the complex sensing electrode structure is better than that of the traditional ITO sensing electrode. In conclusion, the manufacturing cost and the conductibility of the complex sensing electrode structure of the instant disclose can be decreased effectively.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

First Embodiment

Figure 1:
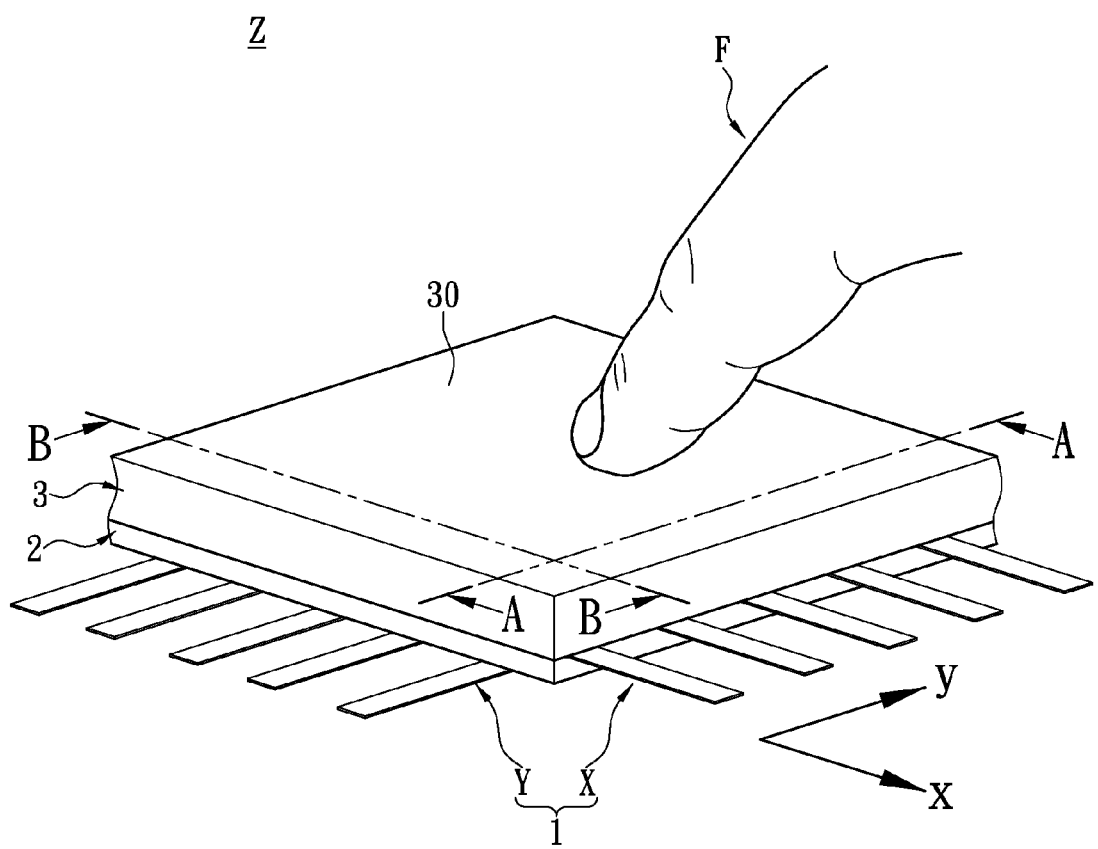
FIG. 1 shows a perspective, assembled, schematic view of the touch panel using the complex sensing electrode structure according to the first embodiment of the instant disclosure.
Figure 2:
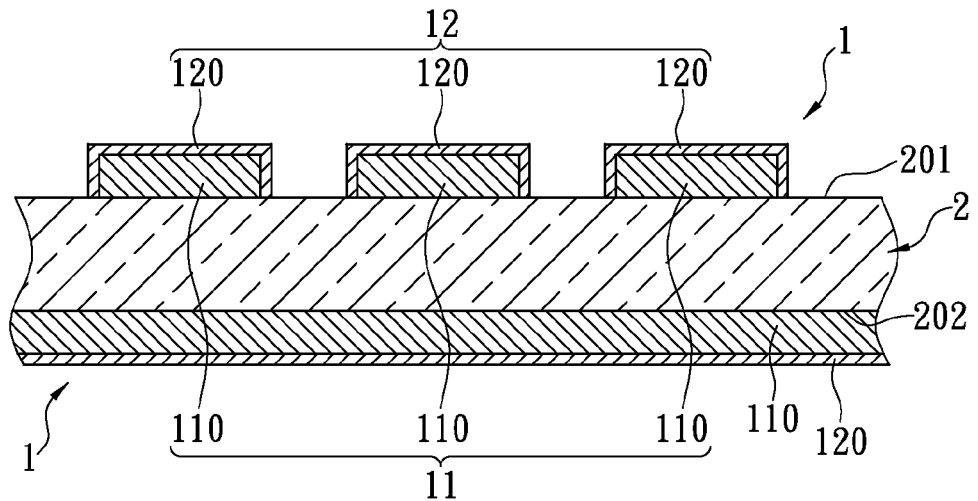
FIG. 2 shows a partial, cross-sectional view taken along the section line A-A of FIG. 1 without using the transparent cover.
Figure 3:
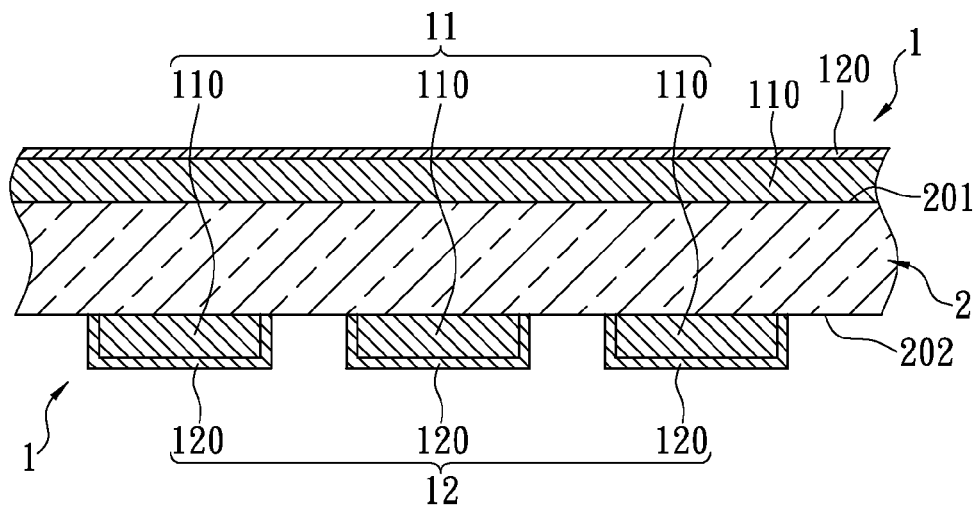
FIG. 3 shows a partial, cross-sectional view taken along the section line B-B of FIG. 1 without using the transparent cover.

FIG. 1 shows a perspective, assembled, schematic view of the touch panel using the complex sensing electrode structure according to the first embodiment of the instant disclosure, where some components of the touch panel are omitted for emphasizing the improvement feature of the complex sensing electrode structure. FIG. 2 shows a partial, cross-sectional view taken along the section line A-A of FIG. 1 without using the transparent cover, and FIG. 3 shows a partial, cross-sectional view taken along the section line B-B of FIG. 1 without using the transparent cover. Referring to FIG. 1 to FIG. 3, the first embodiment of the instant disclosure provides a touch panel Z comprising a complex sensing electrode structure 1, a transparent substrate 2, a transparent cover 3, and the complex sensing electrode structure 1 comprises a first conductive unit 11 and a second conductive unit 12.

Moreover, the first conductive unit 11 includes a plurality of first stripped conductive layers 110 disposed on the transparent substrate 2 and separated from each other by a predetermined distance. The second conductive unit 12 includes a plurality of second stripped conductive layers 120 disposed on the transparent substrate 2 to respectively cover the first stripped conductive layers 110, where the conductive material used by the first stripped conductive layer 110 and the conductive material used by the second stripped conductive layer 120 are different. In other words, the first stripped conductive layer 110 and the second stripped conductive layer 120 can be made of two different materials, respectively. For example, with regard to one of the perfect designs for the complex sensing electrode structure 1, the conductive material used by the first stripped conductive layer 110 may be a conductive polymer material, and the conductive material used by the second stripped conductive layer 120 may be a metal material. With regard to another one of the perfect designs for the complex sensing electrode structure 1, the conductive material used by the first stripped conductive layer 110 may be one of Pd and Sn.

More precisely, referring to FIG. 1, the complex sensing electrode structure 1 includes a plurality of X-axis sensing tracks (X) and a plurality of Y-axis sensing tracks (Y), where each X-axis sensing track (X) and each Y-axis sensing track (Y) can be respectively disposed on the top surface 201 and the bottom surface 202 of the transparent substrate 2, and each X-axis sensing track (X) and each Y-axis sensing track (Y) can be respectively extended along a x-axis and a y-axis. In addition, the transparent cover 3 of the touch panel Z is disposed on the transparent substrate 2 to cover the X-axis sensing tracks (X), where the transparent cover 3 may be a glass substrate or a plastic substrate having a hard coating formed thereon by coating, and the transparent cover 3 has a touch surface 30 (or a contact surface) thereon to allow a user to touch it, such as the user can use his/her finger F to touch the touch surface 30. Hence, when the user uses his/her finger F to touch the touch surface 30 such as sliding or clicking, the X-axis sensing tracks (X) and the Y-axis sensing tracks (Y) can be inducted concurrently to execute corresponding signal transmission or signal control.

With regard to the conductive materials used by the transparent substrate 2, the first stripped conductive layer 110 and the second stripped conductive layer 120, for example, the transparent substrate 2 may be one of polyethylene terephthalate (PET), poly carbonate (PC), polyethylene (PE), poly vinyl chloride (PVC), poly propylene (PP), poly styrene (PS) and polymethylmethacrylate (PMMA) according to different requirements. In addition, the conductive polymer material may be one of polyaniline (PANI), polyphenylene sulfide (PPS), polypyrrole (PPY), poly(p-phenylene) (PPP), polythiophene (PT), poly(p-phenylene vinylene) (PPV), polyfluorene (PF) and polyacetylene (PA) according to different requirements. Moreover, the metal material may be one of Cu, Pt, Al, Au and Ag according to different requirements. However, the above-mentioned design for the transparent substrate 2, the first stripped conductive layer 110 and the second stripped conductive layer 120 of the first embodiment is merely an example and is not meant to limit the instant disclosure.

Furthermore, the first embodiment of the instant disclosure also can provide a method of manufacturing a complex sensing electrode structure 1 that can applied to a touch panel Z, comprising the steps of: forming a plurality of first stripped conductive layers 110 on the transparent substrate 2 by impressing, and then forming a plurality of second stripped conductive layers 120 to respectively cover or enclose the first stripped conductive layers 110 by electroless plating, where the electroless plating method is a low temperature process. However, the above-mentioned steps for forming the first stripped conductive layer 110 and the second stripped conductive layer 120 of the first embodiment is merely an example and is not meant to limit the instant disclosure. Hence, the complex sensing electrode structure 1 of the instant disclosure can be manufactured without using photolithography manufacturing process, thus the manufacturing cost of the complex sensing electrode structure 1 can be reduced.

Second Embodiment

Figure 4:
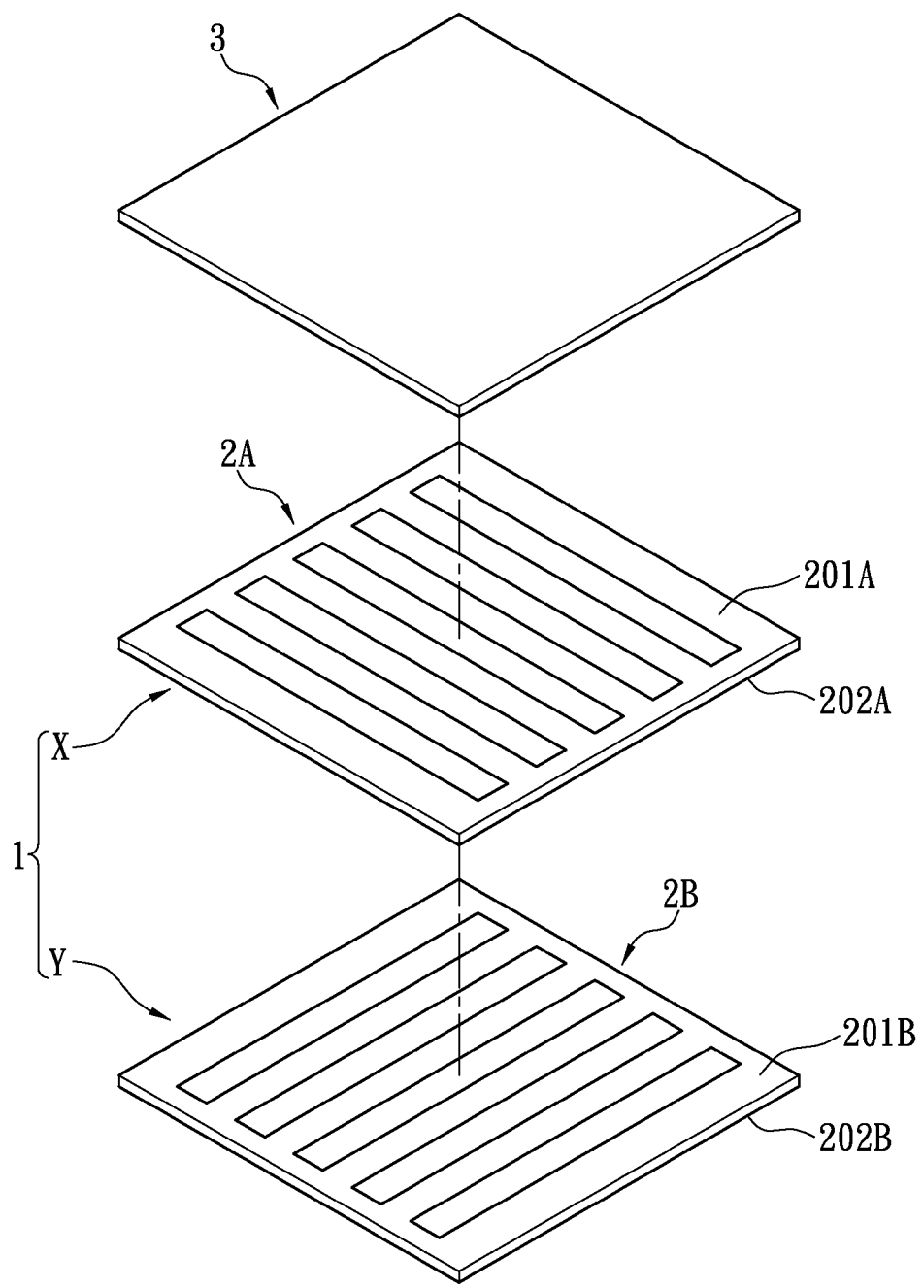
FIG. 4 shows a perspective, exploded, schematic view of the touch panel using the complex sensing electrode structure according to the second embodiment of the instant disclosure.

FIG. 4 shows a perspective, exploded, schematic view of the touch panel using the complex sensing electrode structure according to the second embodiment of the instant disclosure. The second embodiment of the instant disclosure provides another touch panel Z, and the difference between the second embodiment and the first embodiment is as follows: the second embodiment provides a top transparent substrate 2A and a bottom transparent substrate 2B to replace the transparent substrate 2 of the first embodiment, where the X-axis sensing tracks (X) can be disposed on the top surface 201A of the top transparent substrate 2A in advance, the Y-axis sensing tracks (Y) can be disposed on the top surface 201B of the bottom substrate 2B in advance, and the top transparent substrate 2A and the bottom transparent substrate 2B can be tightly connected with each other through optical glue (not shown).

It's worth mentioning that the design positions of the X-axis sensing tracks (X) and the Y-axis sensing tracks (Y) of the complex sensing electrode structure 1 also can be changed. For example, the X-axis sensing tracks (X) can be disposed on the bottom surface 202A of the top transparent substrate 2A and the Y-axis sensing tracks (Y) can be disposed on the bottom surface 202B of the bottom substrate 2B in advance. In other words, the X-axis sensing tracks (X) can be selectively disposed on the top surface 201A or the bottom surface 202A of the top transparent substrate 2A in advance, and the Y-axis sensing tracks (Y) can be selectively disposed on the top surface 201B or the bottom surface 202B of the bottom substrate 2B in advance Therefore, the complex sensing electrode structure can be manufactured by low temperature electroless plating without using the traditional photolithography manufacturing process, thus the instant disclosure can effectively reduce the manpower and the material cost. Furthermore, the complex sensing electrode structure can be composed of the first stripped conductive layers and the second stripped conductive layers that are respectively made of two different conductive materials, thus the conductibility of the complex sensing electrode structure is better than that of the traditional ITO sensing electrode. In conclusion, the manufacturing cost and the conductibility of the complex sensing electrode structure of the instant disclose can be decreased effectively.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A complex sensing electrode structure applied to a touch panel having a transparent substrate, wherein the complex sensing electrode structure comprises: a first conductive unit including a plurality of first stripped conductive layers disposed on the transparent substrate and separated from each other by a predetermined distance; and a second conductive unit including a plurality of second stripped conductive layers disposed on the transparent substrate and separated from each other by a predetermined distance, wherein a conductive material used by the first stripped conductive layer and a conductive material used by the second stripped conductive layer are different; wherein the first stripped conductive layers and the second stripped conductive layers are disposed on the same surface of the transparent substrate, and the first stripped conductive layers are respectively enclosed by the second stripped conductive layers; wherein the conductive material used by the first stripped conductive layer is a conductive polymer material, and the conductive material used by the second stripped conductive layer is a metal material; wherein each first stripped conductive layer has a top surface, a bottom surface opposite to the top surface for contacting the transparent substrate, and an outer perimeter surface connected between the top surface and the bottom surface, and each second stripped conductive layer has a first covering portion disposed on the top surface of the corresponding first stripped conductive layer for covering all of the top surface of the corresponding first stripped conductive layer and a second covering portion surroundingly disposed on the outer perimeter surface of the corresponding first stripped conductive layer and connected between the first covering portion and the transparent substrate for surroundingly covering all of the outer perimeter surface of the corresponding first stripped conductive layer.

2. The complex sensing electrode structure of claim 1, wherein the conductive polymer material is one of polyaniline, polyphenylene sulfide, polypyrrole, poly(p-phenylene), polythiophene, poly(p-phenylene vinylene), polyfluorene and polyacetylene.

3. The complex sensing electrode structure of claim 1, wherein the metal material is one of Cu, Pt, Al, Au and Ag.

4. The complex sensing electrode structure of claim 1, wherein each first stripped conductive layer is formed on the transparent substrate by impressing, and each first stripped conductive layer is enclosed by each corresponding second stripped conductive layer by electroless plating.

5. A complex sensing electrode structure applied to a touch panel having a top transparent substrate and a bottom transparent substrate connected with the top transparent substrate, wherein the complex sensing electrode structure comprises:

a plurality of X-axis sensing tracks disposed on the top transparent substrate, wherein the X-axis sensing tracks are separated from each other, and each X-axis sensing track has a first X-axis stripped conductive layer disposed on the top transparent substrate and a second X-axis stripped conductive layer disposed on the top transparent substrate to enclose the first X-axis stripped conductive layer; and a plurality of Y-axis sensing tracks disposed on the bottom transparent substrate, wherein the Y-axis sensing tracks are separated from each other, and each Y-axis sensing track has a first Y-axis stripped conductive layer disposed on the bottom transparent substrate and a second Y-axis stripped conductive layer disposed on the bottom transparent substrate to enclose the first Y-axis stripped conductive layer;

wherein a conductive material used by the first X-axis stripped conductive layer and the first Y-axis stripped conductive layer is a polymer material, and a conductive material used by the second X-axis stripped conductive layer and the second Y-axis stripped conductive layer is a metal material.

6. The complex sensing electrode structure of claim 5, wherein each first X-axis stripped conductive layer has a top surface, a bottom surface opposite to the top surface for contacting the top side of the top transparent substrate, and an outer perimeter surface connected between the top surface and the bottom surface, and each second X-axis stripped conductive layer has a first covering portion disposed on the top surface of the corresponding first X-axis stripped conductive layer for covering all of the top surface of the corresponding first X-axis stripped conductive layer and a second covering portion surroundingly disposed on the outer perimeter surface of the corresponding first X-axis stripped conductive layer and connected between the first covering portion and the top side of the top transparent substrate for surroundingly covering all of the outer perimeter surface of the corresponding first X-axis stripped conductive layer.

7. The complex sensing electrode structure of claim 5, wherein each first Y-axis stripped conductive layer has a top surface, a bottom surface opposite to the top surface for contacting the top side of the bottom transparent substrate, and an outer perimeter surface connected between the top surface and the bottom surface, and each second Y-axis stripped conductive layer has a first covering portion disposed on the top surface of the corresponding first Y-axis stripped conductive layer for covering all of the top surface of the corresponding first Y-axis stripped conductive layer and a second covering portion surroundingly disposed on the outer perimeter surface of the corresponding first Y-axis stripped conductive layer and connected between the first covering portion and the top side of the bottom transparent substrate for surroundingly covering all of the outer perimeter surface of the corresponding first Y-axis stripped conductive layer.

8. The complex sensing electrode structure of claim 5, wherein the X-axis sensing tracks are disposed on the top side of the top transparent substrate, the first X-axis stripped conductive layer is disposed on the top side of the top transparent substrate, and the second X-axis stripped conductive layer is disposed on the top side of the top transparent substrate, wherein the Y-axis sensing tracks are disposed on the top side of the bottom transparent substrate, the first Y-axis stripped conductive layer is disposed on the top side of the bottom transparent substrate, and the second Y-axis stripped conductive layer is disposed on the top side of the bottom transparent substrate.

9. The complex sensing electrode structure of claim 5, wherein the X-axis sensing tracks are disposed on the bottom side of the top transparent substrate, the first X-axis stripped conductive layer is disposed on the bottom side of the top transparent substrate, and the second X-axis stripped conductive layer is disposed on the bottom side of the top transparent substrate, wherein the Y-axis sensing tracks are disposed on the bottom side of the bottom transparent substrate, the first Y-axis stripped conductive layer is disposed on the bottom side of the bottom transparent substrate, and the second Y-axis stripped conductive layer is disposed on the bottom side of the bottom transparent substrate.

* * * * *